United States Patent
Gerbetz

(10) Patent No.: US 6,633,147 B2
(45) Date of Patent: Oct. 14, 2003

(54) METHOD FOR CLOSING A MOTOR DRIVEN WINDOW

(75) Inventor: Robert Gerbetz, Waukegan, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/865,342

(22) Filed: May 25, 2001

(65) Prior Publication Data

US 2002/0190677 A1 Dec. 19, 2002

(51) Int. Cl.[7] .............................................. H02P 7/00
(52) U.S. Cl. ........................................ 318/434; 318/432
(58) Field of Search ........................ 318/466, 468, 318/470, 434, 456, 457, 461, 366, 369, 280, 480, 269, 283, 445, 446, 286, 469

(56) References Cited

U.S. PATENT DOCUMENTS

| | | | | |
|---|---|---|---|---|
| 5,610,484 A | * | 3/1997 | Georgin | 318/286 |
| 5,977,732 A | * | 11/1999 | Matsumoto | 318/283 |
| 6,034,495 A | * | 3/2000 | Tamagawa et al. | 318/266 |
| 6,034,497 A | * | 3/2000 | Tamagawa et al. | 318/466 |
| 6,051,945 A | * | 4/2000 | Furukawa | 318/286 |
| 6,150,784 A | * | 11/2000 | Nagaoka | 318/264 |
| 6,297,609 B1 | * | 10/2001 | Takahashi et al. | 318/283 |
| 6,366,042 B1 | * | 4/2002 | Gerbetz | 318/286 |
| 6,426,604 B1 | * | 7/2002 | Ito et al. | 318/466 |
| 6,563,279 B2 | * | 5/2003 | Sugawara | 318/443 |

FOREIGN PATENT DOCUMENTS

JP  05056681 A  *  3/1993  ........... H02P/5/408

* cited by examiner

Primary Examiner—Robert E. Nappi
Assistant Examiner—Patrick Miller
(74) Attorney, Agent, or Firm—Steven A. May; Thomas V. Miller

(57) ABSTRACT

A method for closing a motor-driven window is disclosed, including the steps of raising the window after the window has been stopped; evaluating the torque after initially raising the window; and stopping the window if the pinch force exceeds a predetermined limit. Torque is preferably estimated according to the present invention using the sum of dynamic torque, electromagnetic torque, and core loss compensation. Consistent values of torque are estimated during window starts and stops, which is beneficial in providing accurate pinch force measurements and avoiding false pinch indications.

10 Claims, 4 Drawing Sheets

| TIME (COUNTS) | CORE LOSS CORRECTION (COUNTS) |
|---|---|
| >=6068 | +7 |
| 3035-6067 | +6 |
| 2022-3034 | +5 |
| 1517-2021 | +4 |
| 1213-1516 | +3 |
| 1011-1212 | +2 |
| 867-1010 | +1 |
| 759-866 | +0 |
| 674-758 | -1 |
| <=673 | -2 |

| | DELTA_T1 | DELTA_T2 | ..... | DELTAT_N |
|---|---|---|---|---|
| T_1 | TORQUE_11 | TORQUE_12 | | TORQUE_IN |
| ⋮ | | | | |
| T_N | TORQUE_N1 | TORQUE_N2 | | TORQUE_NN |

METHOD FOR CLOSING A MOTOR DRIVEN WINDOW

FIELD OF THE INVENTION

The present invention relates to the general subject of power windows, and more particularly, to a system and method for determining torque in a window lift mechanism.

BACKGROUND OF THE INVENTION

Power windows are standard equipment in many vehicles manufactured at the present time. An important problem in power window systems relates to pinch force, which is defined as the force that is exerted upon an obstruction (e.g., a person's hand or head) that is introduced between the window glass and the window frame while the window is closing. One accepted specification is that, while the window gap (i.e., the distance between an upper edge of the window glass and a corresponding top portion of the window frame) is between 4 millimeters (mm) and 30 mm (i.e., the pinch region), the pinch force must not exceed 100 newtons.

In some existing power window systems, the shaft of the electric motor driving the window generally rotates too fast to be stopped in time to avoid exceeding a 100 newton pinch force. This is a consequence of the fact that conventional power window motors have considerable inertia and thus do not slow down instantaneously. Therefore, to avoid exceeding the maximum allowable pinch force, it is necessary that the window speed be limited while the window is being raised through the pinch region.

One approach is to simply hold the speed at a constant low level over the full range of travel. Unfortunately, this approach has the disadvantage of significantly increasing the amount of time it takes to close the window, which can be a major inconvenience (e.g., upon leaving a toll booth). Additionally, in many prior art systems, the speed at which the window closes is critically dependent upon the battery voltage, which can vary over an appreciable range. For example, in systems that close the window at a uniform speed (which must be relatively low in order to satisfy anti-pinch requirements), a reduction in battery voltage has the undesirable effect of further decreasing the already low speed at which the window closes.

Another problem exists in current based systems. Namely, such systems do not work well during window start and stop situations. Accordingly, there is a need for a window lift control system that can accurately determine a pinch condition, even during start and stop conditions.

DETAILED DESCRIPTION OF THE PREFERRED EMBODIMENTS

Currently there is no method to accurately estimate motor shaft torque over a considerable speed range in an anti pinch window lift control system. Torque is not estimated in existing systems. Rather, speed or current is used as an indicator of window load, or motor torque is measured directly using a torque transducer. The speed and current based systems do not work during window start and stop situations. Significant filtering of the speed and current signals results in the inability to meet applicable federal motor vehicle safety specs. The speed signals are too erratic and difficult to process to successfully estimate dynamic torque.

Torque is preferably estimated according to the present invention using the sum of acceleration torque, electromagnetic torque, and core loss torque. Consistent values of torque are estimated during window starts and stops, which is beneficial in providing accurate pinch force measurements and avoiding false pinch indications. The anti-pinch system using a motor shaft torque estimator comprised of electromagnetic and dynamic torque is much more accurate than a current or speed based system for determining pinch forces on window startup. However, to generate historical torque data during starts and stops that is consistent at all speeds, the effect of motor core loss is preferably included. Accordingly, a motor core loss compensation torque is preferably included in the anti-pinch algorithm.

Figure 1:
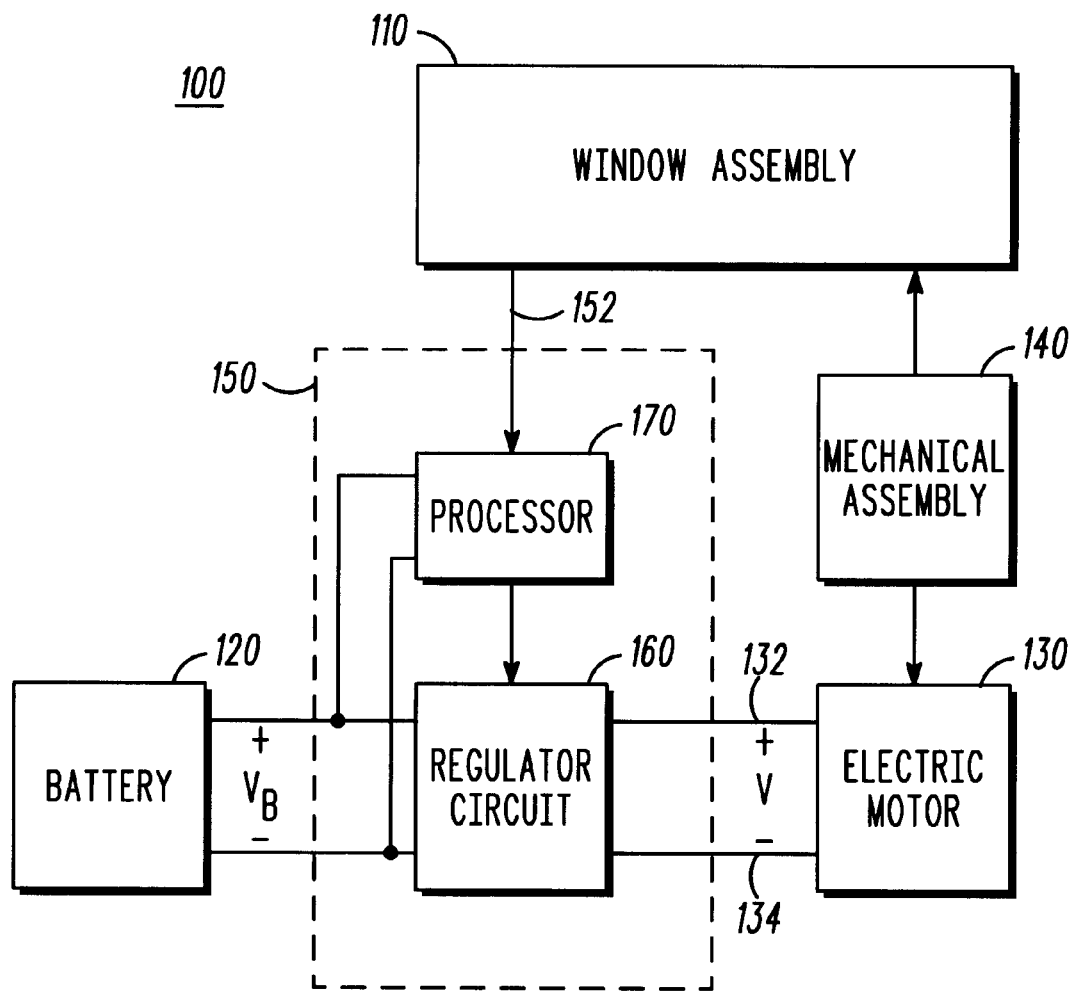
FIG. 1 is a block diagram description of a power-window system, in accordance with a preferred embodiment of the present invention.

Turning now to FIG. 1, a vehicle power-window system 100 comprises: a window assembly 110, a battery 120, an electric motor 130, a mechanical assembly 140, and a control circuit 150. Window assembly 110 includes window glass, a window frame, and a sensor (not shown). The distance between an upper edge of the window glass and a corresponding top portion of the window frame defines a window gap. During operation, the sensor provides a signal that is indicative of the window gap. It is not necessary that the sensor provide a direct measurement of the window gap as previously defined herein; for example, the sensor may track the positions of one or more reference points on the window glass, which can then be readily translated into the value of the window gap simply by adding an appropriate numerical offset.

Battery 120 supplies a battery voltage, $V_B$, and serves as the source of energy for opening and closing the window. In a vehicle application, battery 120 is simply the existing 12 volt main battery installed in the vehicle. Electric motor 130 has a rotatable shaft (not shown) and a pair of input terminals 132, 134 for receiving a drive voltage, V. The speed of rotation of the shaft is understood to be a function of the drive voltage, V. Preferably, for a given mechanical load on the shaft, an increase in V effectuates an increase in the rotational speed of the shaft, and a decrease in V effectuates a decrease in the rotational speed of the shaft. Mechanical assembly 140 couples the shaft of electric motor 130 to the window glass of window assembly 110 such that rotation of the shaft in one direction lowers (i.e., opens) the window, and rotation of the shaft in the opposite direction raises (i.e., closed) the window.

Control circuit 150 preferably comprises a regulator circuit 160 and a processor 170. Regulator circuit 160 is coupled between battery 120 and input terminals 132, 134 of electric motor 130. Regulator circuit 160 has a duty cycle, δ that is adjusted in response to the values of the window gap, y, and the battery voltage, $V_B$. The drive voltage, V, supplied to electric motor 130 is then a function of the battery voltage, $V_B$, and the duty cycle, δ. In practice, regulator circuit 460 may be implemented using any of a number of known topologies, such as a bridge-type switching regulator, well known to those skilled in the art.

Preferably, the drive voltage, V, supplied to electric motor 130 by control circuit 150 is substantially unaffected by at least some changes in the battery voltage, $V_B$. For example, an increase in $V_B$ (e.g., above its nominal value of 12 volts) is met by a decrease in the duty cycle, δ, of regulator circuit 160, such that the drive voltage, V, remains unchanged.

Figure 2:
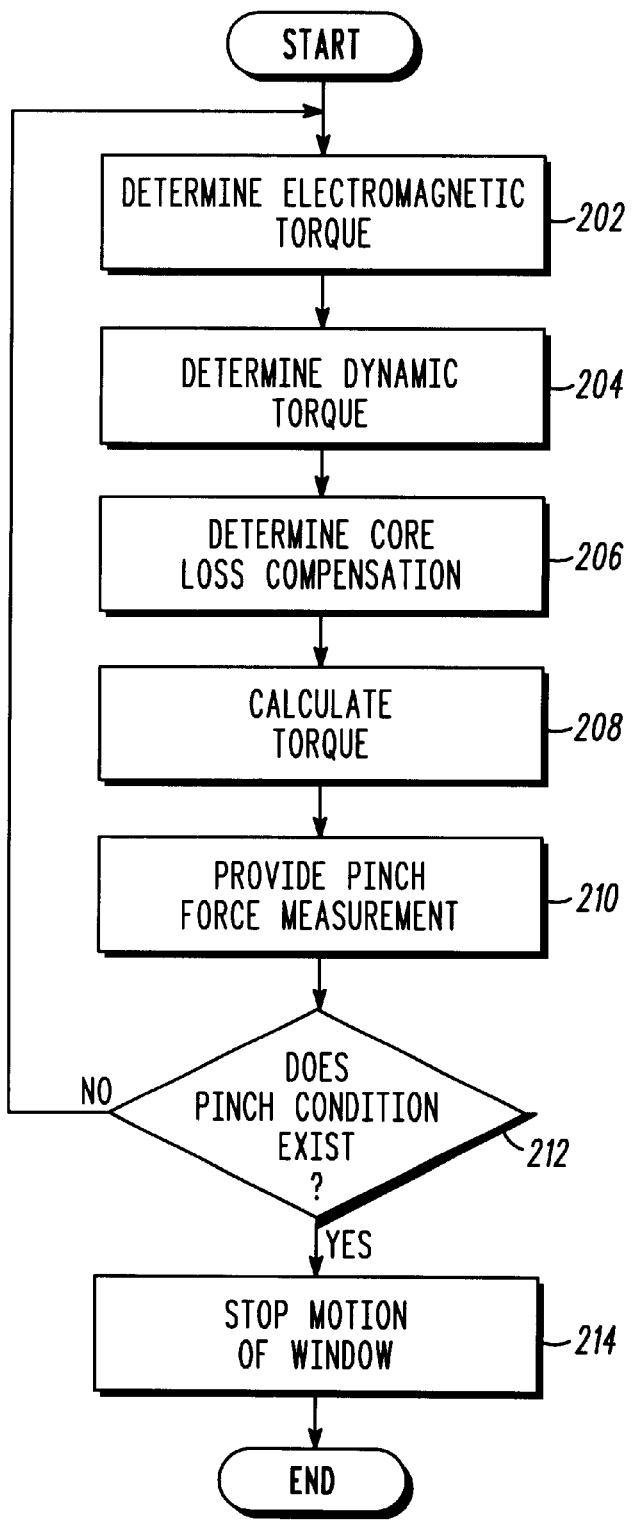
FIG. 2 is a flowchart that describes a method for closing a motor-driven window, in accordance with a preferred embodiment of the present invention.

Turning now to FIG. 2, steps for the method of determining torque according to the present invention are shown. The electromagnet torque and dynamic torque is determined at steps 202 and 204. Where electromagnetic torque is directly proportional to motor current, dynamic torque is proportional to acceleration and effective system rotational inertia and core loss compensation is a term proportional to motor speed. The core loss compensation is also determined at a step 206. Basically, it is beneficial to compensate for the motor no-load rotational losses, which are fairly high. A torque proportional to speed is generated due to winding self-induced losses and iron losses in the motor. Since the core loss is speed dependent, a table of core loss correction in counts of torque is generated as a function of time between hed edges, where time units are also in counts. Any motor speed can be used as a base for the core loss compensation table, as shown for example in FIG. 3.

The torque is calculated at a step 208. The torque calculation used in the new anti-pinch window lift mechanism control is the following:

Torque=electromagnetic $f$(current) torque+dynamic $f$(acceleration) dynamic torque+core loss $f$(speed of motor)

Compensation could cause 20–30% error, enough to confuse pinch from non-pinch. The pinch-force measurement provided at a step 210. It is then determined whether a pinched condition exists at a step 212. If a pinched condition exists, the motion of the windows stop at a step 214.

Figures 3, 4:
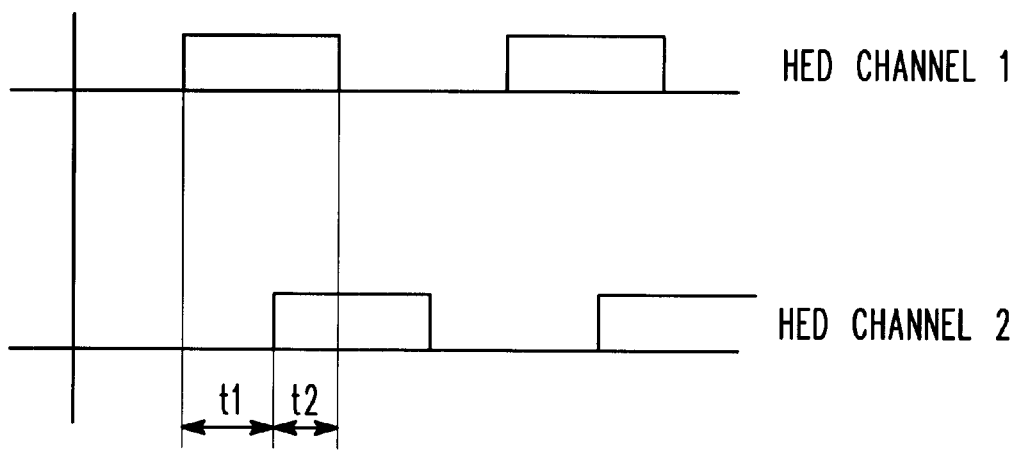
FIG. 3 is a table of time and core loss corrections, in accordance with a preferred embodiment of the present invention.
FIG. 4 is a timing diagram for two hall effect devices, in accordance with a preferred embodiment of the present invention.

Turning now to FIG. 3, an exemplary table shows the time (in counts) and corresponding core loss corrections (in counts). The following table could be used according to the present invention.

| TIME (COUNTS) | CORE LOSS CORRECTION (COUNTS) |
| --- | --- |
| > = 6068 | +7 |
| 3035–6067 | +6 |
| 2022–3034 | +5 |
| 1517–2021 | +4 |
| 1213–1516 | +3 |
| 1011–1212 | +2 |
| 867–1010 | +1 |
| 759–866 | 0 |
| 674–758 | −1 |
| < = 673 | −2 |
| 0–255 | |
| 0–50 | Over normal operation |

Table values can be negative or positive, depending on the base speed used for generating the table. The core loss correction is negative for speeds higher than the base correction speed since core loss generated torque is higher at higher speeds and it is necessary to reduce the torque measured at a higher speed to bring it to a common base with a torque measured at a lower speed. The smaller values of time in the table correspond to higher speeds.

The present invention estimates motor shaft torque on a load due to acceleration and deceleration estimated from the output of two quadrature hall effect device (HED) signals, as shown in FIG. 4. The present method also provides a means for accurately estimating torque due to acceleration and deceleration of a motor and mechanical system components while using an 8-bit microprocessor, where the accurate calculation of torque is not otherwise possible during a very limited time period. Signals from two HED's located in quadrature in the motor provide the information necessary to estimate direction, speed and acceleration. The present method preferably uses a torque look-up table with T and Delta__T indices to determine torque due to acceleration. TI and t2 are consecutive times between signal edges.

Figures 5, 6:
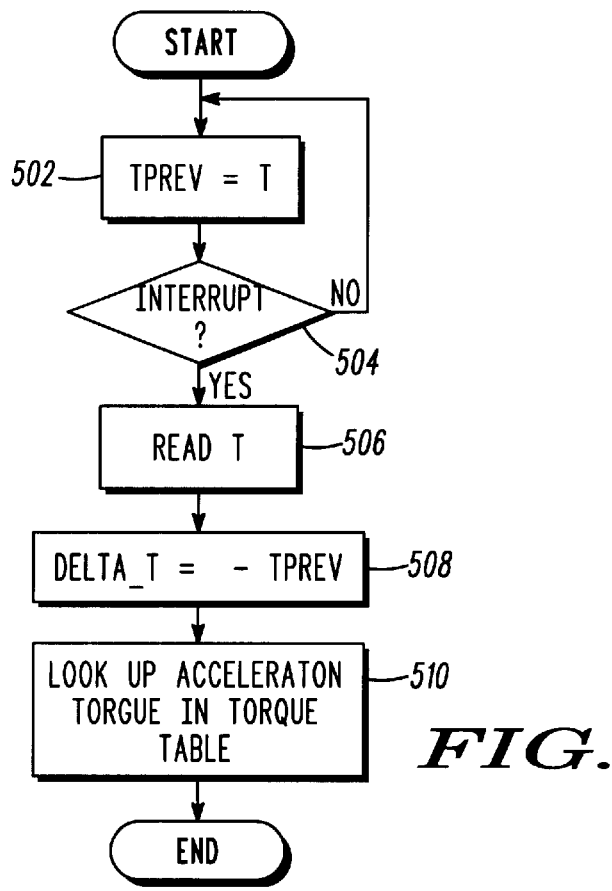
FIG. 5 is a flow chart showing the use of a lookup table according to an alternate embodiment of the present invention.
FIG. 6 describes a look-up table, in accordance with the embodiment of FIG. 5 of the present invention.

Turning now to FIG. 5, a flow chart shows a method for closing a motor driven window according to an alternate embodiment of the invention, which preferably determines motor shaft dynamic torque using a table with the variables time and delta time as table indices. The disclosed method avoids the calculation of dynamic torque, which is very time consuming and inaccurate in an 8-bit processor. The method provides a means to perform a table lookup, which is fast and accurate.

Referring specifically to FIG. 5, before receiving an interrupt to begin calculating a new value of torque, TPREV is set equal to the previously read value of time at a step 502, where time is the period between edges of the HED signals. An interrupt at a step 504 indicates that one of the HED's has changed state, and a new value of time, T, is read at a step 506. The difference between the most recent and previous time periods, Delta__T, is then calculated at a step 508. T and Delta-T is compared to the indices of the torque table to determine the location of the correct torque value corresponding to T and Delta-T.

When the HED's complete one electrical cycle per revolution, the torque due to acceleration and deceleration is given by:

Torque=−(J*pi)* Delta__T/(2*T^3−3*T^2*Delta__t +T*Delta__T^2), where T=t2

Delta__T=t2−t1

J=effective inertia.

A table of acceleration-induced torque is generated as a function of T and Delta__T. The magnitude of the T and Delt__T table indices are scaled in bits, where each bit represents a fixed time period. The calculated table value of torque is also scaled with one bit corresponding to a predetermined value of torque. To ensure accurate torque calculations over a wide speed range, the T and delta-T table indices can be scaled logarithmically. For example, in one application a torque table was constructed with 100 value of T and 100 values of delta-T using the following scaling:

$T(n)$=INTEGER[(0.0015*1.0433339^n)/0.000004], where n=0 to 99

Delta__$T(n)$=INTEGER[(0.000004* 1.077038^n/0.000004], where n=0 to 99

The index values calculated in this example are integers where each count represents 4 microseconds. Table values of torque are calculated for each combination of T and Delta__T, as shown in FIG. 6. Again using a recent application as an example, where J*pi=0.00036, torque was calculated with a resolution of 0.06 inch pounds per count or bit:

$$\text{Torque}(i,j)=\text{INTEGER}[(0.00036*(\text{Delta}\_T)(j)/2*T(i)^3-3*T(i)^2*\text{Delta}\_T(j)+T(i)*\text{Delta}\_T(j)^2))/0.06]$$

Many of the table values will be 0 or the maximum value. To save memory, the table can be compressed by eliminating 0's and maximum values as these extremes will not be encountered during operation.

Although the present invention has been described with reference to certain preferred embodiments, numerous modifications and variations can be made by those skilled in the art without departing from the novel spirit and scope of this invention. For example, although the present invention finds particular application in closing a window, the invention could be used in any device which would need an anti-pinch feature.

What is claimed is:

1. A method for closing a motor-driven element, the steps comprising:

raising the element after the element has been stopped;

evaluating a torque after initially raising the element and during an initial element start period; and stopping the element if a pinch force exceeds a predetermined limit;

wherein the step of evaluating the torque after initially raising the element and during the initial element start period includes a step of determining core loss compensation.

2. The method of claim 1, wherein said step of evaluating torque includes a step of determining electromagnetic torque.

3. The method of claim 1, wherein said step of evaluating torque includes a step of determining dynamic torque.

4. The method of claim 1, wherein said step of evaluating torque includes a step of determining electromagnetic torque and dynamic torque.

5. The method of claim 1, wherein said step of evaluating torque includes estimating acceleration from the output of a first hall effect device and a second hall effect device.

6. The method of claim 1, further comprising a step of using an acceleration lookup table to determine torque due to acceleration.

7. A method for closing a motor-driven element the method comprising the steps of:

raising the element after the element has been stopped;

evaluating electromagnetic torque and dynamic torque during an initial element start period immediately after the element is first raised;

determining a core loss compensation during the initial element start period immediately after the element is first raised;

providing a pinch force measurement; and stopping the element if the pinch force measurement exceeds a predetermined limit.

8. The method of claim 7, wherein said step of evaluating torque includes estimating acceleration from the output of a first hall effect device and a second hall effect device.

9. The method of claim 7, further comprising a step of using an acceleration lookup table to determine a torque due to acceleration.

10. A method for closing a motor-driven window, the method comprising the steps of:

raising the window after the window has been stopped;

determining electromagnetic torque during an initial window start period immediately after the window is first raised;

determining dynamic torque during the initial window start period;

determining core loss compensation during the initial window start period;

calculating a torque based upon electromagnetic torque, dynamic torque, and core loss compensation, providing a pinch force measurement; and stopping the window if a pinch condition exists.

* * * * *